J. A. McCLELLAND.
Shifting-Back for Vehicles.

No. 221,085. Patented Oct. 28, 1879.

WITNESSES.
James B. Lizius.
R. P. Daggett.

INVENTOR.
James A. McClelland,
PER
C. Bradford.
ATTORNEY.

N. PETERS, PHOTO-LITHOGRAPHER, WASHINGTON, D. C.

UNITED STATES PATENT OFFICE.

JAMES A. McCLELLAND, OF FOWLER, INDIANA.

IMPROVEMENT IN SHIFTING-BACKS FOR VEHICLES.

Specification forming part of Letters Patent No. 221,085, dated October 28, 1879; application filed August 30, 1879.

*To all whom it may concern:*

Be it known that I, JAMES A. MCCLELLAND, of the town of Fowler, county of Benton, and State of Indiana, have invented certain new and useful Improvements in Folding Removable Backs for Buggy-Seats, of which the following is a specification.

Reference is had to the accompanying drawings, which are made a part hereof, and on which similar letters of reference indicate similar parts.

Figure 1:
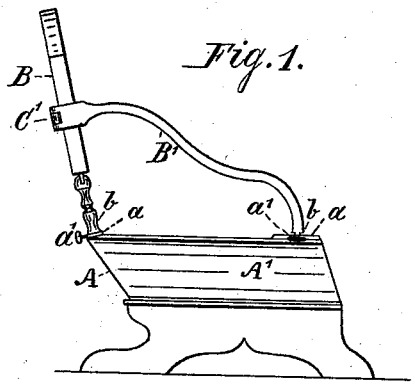
Figure 2:
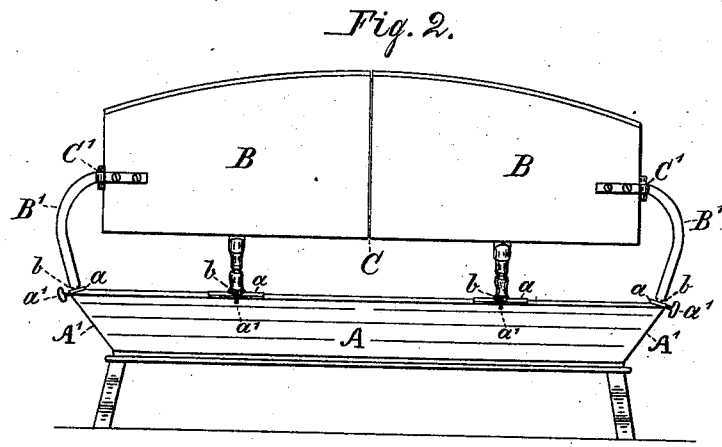
Figure 3:
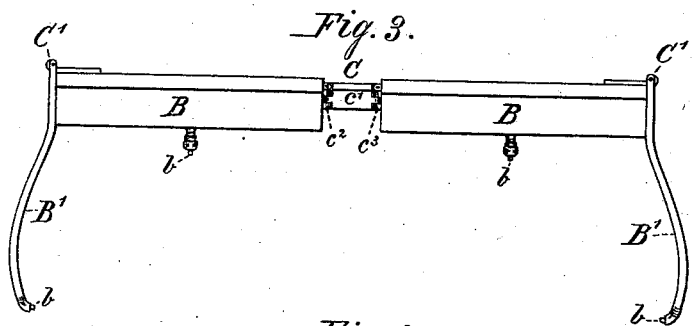
Figure 4:
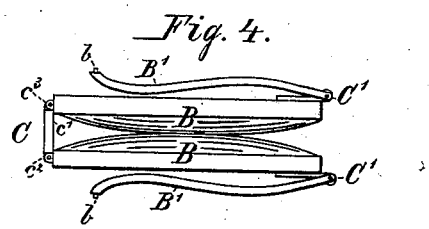

Figure 1 is a side elevation of a buggy-seat having one of my improved extension-backs attached. Fig. 2 is a rear elevation thereof. Fig. 3 is a top or plan view of the back separately drawn out and ready to be folded. Fig. 4 is a plan view of my back folded up and ready to be put away.

The object of my invention is to provide a removable extension-back for the seats of buggies and other vehicles, which can be folded up into a small compass when not in use, so as to be placed under the seat, or otherwise conveniently carried about the vehicle, and thus be at all times accessible for instant use.

This object I accomplish by providing my device with joints, as hereinafter more particularly specified.

In the drawings, the portions marked A A' A' are the back and arms of an ordinary buggy-seat. To these small iron sockets $a\ a\ a\ a$, having thumb-screws $a'\ a'\ a'\ a'$ or equivalent devices, are attached.

An extension-back, B, jointed at C by a double joint, and having arm-pieces B' B' jointed thereto, and which embodies my invention, is provided with small feet $b\ b\ b\ b$, which enter the sockets $a\ a\ a\ a$, and are secured therein by the thumb-screws $a'\ a'\ a'\ a'$, and is thus securely attached to the vehicle back.

As before stated, the joint C in the back B is a double joint. The parts of which it is composed preferably slide into the back, so that the central part, $c'$, of the hinge holds it rigid while in use; but when it is desired to fold up the device, it is pulled out to its greatest length, and the two hinge-joints $c^2\ c^3$ enable it to be folded together. The arms B' B' being hinged at C' C' to the back in the manner shown, are readily folded around against the back side thereof, and the device is thus brought into the position shown in Fig. 4, and occupies but comparatively little space.

Having thus fully described my said invention, what I claim as new, and desire to secure by Letters Patent, is—

1. The combination, with an extension-back for the seats of buggies and other vehicles, of the double hinge-joint $c'\ c^2\ c^3$ to enable said back to be folded in the center, substantially as shown and specified.

2. The combination, with the two parts of a folding removable back for seats for buggies and other vehicles, of a central hinge constructed to slide into said parts, and thus hold said back rigid when in use, substantially as shown and specified.

3. The combination of the several parts B B B' B' of an extension seat-back, the parts B B being hinged together at C with a double sliding hinge, and to the parts B' B', at C' C', by ordinary hinge-joints, substantially as and for the purposes specified.

In witness whereof I have hereunto set my hand and seal at Indianapolis, Indiana, this 15th day of August, A. D. 1879.

JAMES A. McCLELLAND. [L. S.]

In presence of—
C. BRADFORD,
J. D. WHITE.